US008494551B2

(12) United States Patent
Vos et al.

(10) Patent No.: US 8,494,551 B2
(45) Date of Patent: Jul. 23, 2013

(54) METHOD AND SYSTEM FOR PERFORMING POSITION UPDATES IN A WIRELESS COMMUNICATION SYSTEM

(75) Inventors: Gustav Gerald Vos, Surrey (CA); Kevin Walton, Vancouver (CA)

(73) Assignee: Sierra Wireless Inc., Richmond (CA)

(*) Notice: Subject to any disclaimer, the term of this patent is extended or adjusted under 35 U.S.C. 154(b) by 447 days.

(21) Appl. No.: 12/777,475

(22) Filed: May 11, 2010

(65) Prior Publication Data

US 2010/0285816 A1 Nov. 11, 2010

Related U.S. Application Data

(60) Provisional application No. 61/177,152, filed on May 11, 2009.

(51) Int. Cl.
*H04W 24/00* (2009.01)
(52) U.S. Cl.
USPC ............ 455/456.1; 455/456.2; 455/456.5; 455/415; 455/441
(58) Field of Classification Search
USPC .............. 455/456.1, 456.2, 456.5, 415, 441
See application file for complete search history.

(56) References Cited

U.S. PATENT DOCUMENTS

| | | | |
|---|---|---|---|
| 5,097,499 A | 3/1992 | Cosentino | |
| 5,606,596 A | 2/1997 | Jain et al. | |
| 5,642,398 A | 6/1997 | Tiedemann, Jr. et al. | |
| 5,740,538 A | 4/1998 | Joyce et al. | |
| 5,898,923 A | 4/1999 | Gaasvik et al. | |
| 5,953,667 A | 9/1999 | Kauppi | |
| 5,960,345 A | 9/1999 | Laatu | |
| 5,960,356 A | 9/1999 | Alperovich et al. | |
| 6,101,388 A | 8/2000 | Keshavachar | |
| 6,138,025 A | 10/2000 | Lee et al. | |
| 6,236,861 B1 | 5/2001 | Naor et al. | |
| 6,363,255 B1 | 3/2002 | Kuwahara | |
| 6,584,314 B1 | 6/2003 | Haumont et al. | |
| 6,819,659 B1 | 11/2004 | Palat et al. | |
| 6,922,561 B2 | 7/2005 | Chen et al. | |
| 7,333,811 B2 | 2/2008 | Lou | |
| 7,477,895 B2 | 1/2009 | Chen et al. | |
| 2004/0176113 A1 | 9/2004 | Chen et al. | |
| 2004/0180674 A1 | 9/2004 | Blomqvist et al. | |
| 2005/0026619 A1 | 2/2005 | Jha | |
| 2005/0159155 A1 | 7/2005 | Chen et al. | |
| 2005/0174283 A1* | 8/2005 | Muramatsu et al. | 342/357.07 |
| 2006/0046723 A1 | 3/2006 | Liu | |
| 2006/0129607 A1* | 6/2006 | Sairo et al. | 707/200 |
| 2008/0113672 A1* | 5/2008 | Karr et al. | 455/456.1 |
| 2008/0119209 A1 | 5/2008 | Upp | |

OTHER PUBLICATIONS http://en.wikipedia.org/wiki/Mobility_management, pp. 1-5, downloaded on Sep. 10, 2012.*

* cited by examiner

*Primary Examiner* — Manpreet Matharu
(74) *Attorney, Agent, or Firm* — Mintz, Levin, Cohn, Ferris, Glovsky and Popeo, P.C.

(57) ABSTRACT

The present invention provides a method and system for performing position area updates in a wireless communication system configured to broadcast a plurality of position area codes, each associated with one of a plurality of position areas. The method comprises moving the wireless terminal from a first position area to a second position area; evaluating a predetermined condition; and performing the position area update when the predetermined condition is met.

32 Claims, 10 Drawing Sheets

METHOD AND SYSTEM FOR PERFORMING POSITION UPDATES IN A WIRELESS COMMUNICATION SYSTEM

CROSS REFERENCE TO RELATED APPLICATION

The present application claims priority under 35 U.S.C. §119 to U.S. Provisional Application Ser. No. 61/177,152 filed May 11, 2009, entitled "Method and System for Performing Position Updates in a Wireless Communication System" the disclosure of which is incorporated herein by reference.

FIELD OF THE INVENTION

The present invention pertains in general to locating wireless terminals in wireless communication systems and in particular to aspects of defining and updating position information of wireless terminals.

BACKGROUND

The evolution of wireless communication systems has dramatically increased beyond voice services. For example, data services have been adopted for communication with users and machines as well as for applications requiring communication between machines. Wireless communication has been increasingly adopted for data transfer, collection and/or submission, for example from and/or to wireless meters and teller machines. The rising use of machine-to-machine (M2M) communications has emphasized aspects of data traffic management that may go beyond those regarding mobility in traditional wireless communication systems that are not well supported by traditional wireless networks for human-to-human communication.

Many existing wireless communication systems are configured to provide access to a number of voice and data services from mobile devices to facilitate wireless communication. Wireless data services are supported by digital wireless communication systems including GPRS (general packet radio service) as supported by GSM (Global System for Mobile Communication), or UMTS (Universal Mobile Telephone System) and will be part of the LTE (Long Term Evolution) system, for example.

Wireless communication systems are generally hierarchically organized and comprise one or more subnetworks. Each subnetwork may be configured to provide predetermined functions and/or services to predetermined areas. Subnetworks may be interconnected by a corresponding backbone network. A subnetwork generally comprises a number of interconnected packet data service nodes that can render data packet services for wireless terminals via several base stations. Practically all present civil wireless communication systems provide packet-switched data transmission between a support node and the wireless terminals associated with it. Certain subnetworks may be connected to an external data network, for example, to a public switched data or phone network, via predetermined gateway nodes for relaying corresponding services. Wireless communication systems service thus allows packet data transmission between wireless terminals and external data networks.

The increasing adoption and availability of access to wireless communication systems proves useful not only for applications of mobile wireless terminals but for convenient interconnection of wireless terminals independent of benefits provided by sustaining mobile wireless connectivity. Mobility aspects of a growing number of applications of wireless terminals, for example, for machine communication, however, may differ from those of mobile phones traditionally used for human to human communication.

Wireless communication system designers have typically addressed mobility aspects for wireless terminals without distinguishing between different applications of different wireless terminals. One aspect of mobility management is that a wireless terminal may be fully operatively associated only with a portion of a wireless communication system at a time and that therefore its location, or the portion of the system that it is associated with, needs to be tracked in order for the wireless communication system to be able to contact the wireless terminal without having to page for it in the entire network. For this purpose, wireless terminals typically initiate an update of their location periodically or when they roam into areas serviced by other portions of the wireless communication system. Such updates may occur in the form of routing and location area updates in UMTS or in the form of tracking area updates in LTE, for example. Communications for wireless terminal tracking and/or paging may cause a significant amount of network traffic without exchanging any data payload to and/or from the wireless terminals, however this network traffic can be required to maintain an operational condition of the system. Increasing use of many M2M applications may therefore result in an unnecessary increase in traffic for control overhead, which can be a burden on a wireless network.

A number of solutions have been suggested that attempt to reduce network traffic overhead caused by wireless terminal tracking and/or paging. For example, U.S. Pat. Nos. 7,477,895, 7,333,811, 6,922,561, 6,584,314, 6,363,255, 6,236,861, 6,138,025, 6,101,388, 5,960,356, 5,960,345, 5,953,667, 5,898,923, 5,642,398, 5,606,596 and 5,097,499, and United States Patent Application Publication Nos. 2008/0119209 and 2004/0176113, describe aspects of reducing network traffic caused by wireless terminal tracking and/or paging. None of these, however, is useful for applications where wireless terminals rarely move or, in comparison to their mobility, rarely need to transmit, or rarely need to be paged and/or receive data.

Therefore there is a need for a solution that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and system for performing position area updates in a wireless communication system. According to an aspect of the present invention there is provided a method for performing a position area update for a wireless terminal in a wireless communication system configured to broadcast a plurality of position area codes, each position area code associated with one of a plurality of position areas, the method comprising: evaluating a predetermined condition upon movement of the wireless terminal from a first position area to a second position area; and performing the position area update when the predetermined condition is met.

According to another aspect of the present invention there is provided a wireless communication system configured to broadcast a plurality of position area codes, each position area code associated with one of a plurality of position areas; the wireless communication system including one or more wireless terminals and a wireless communication system backbone operatively coupled to the one or more wireless terminals; the one or more wireless terminals and the wireless communication system backbone configured to perform a position area update when one or more of the wireless terminals move from a first position area to a second position area and a predetermined condition is met.

According to another aspect of the present invention there is provided a wireless terminal for performing a position area update in a wireless communication system configured to broadcast a plurality of position area codes, each position area code associated with one of a plurality of position areas, the wireless terminal comprising: a wireless communication system interface configured to communicate with the wireless communication system and to receive the position area codes; and a control system operatively coupled to the wireless communication system interface and configured to evaluate a predetermined condition and to perform the position area update when the predetermined condition is met.

DETAILED DESCRIPTION OF THE INVENTION

Definitions

The term "position area" is used to refer to a portion of a wireless communication system that is used to service a corresponding geographical region and which may be used for locating a wireless terminal. A wireless communication system may comprise one or more position areas each associated with corresponding portions of the wireless communication system. A position area may correspond with a routing area, a location area, or a tracking area as used respectively in a UMTS or LTE group of routing, location or tracking areas, or, for example, with another area as defined by another wireless communication system.

The term "wireless terminal" is used to refer to an apparatus for analog and/or digital transmission and/or reception of signals for communication purposes via electromagnetic radiation propagating, for example, through vacuum, or air, or a generally non-conductive medium to or from another apparatus. The wireless terminal may use radio signals formatted according to one or more of a number of wireless communication systems including mobile phone networks such as cellular or satellite phone networks, or other current or future wireless communication systems, for example. A wireless terminal can comprise or be included in one or more of various forms of handheld/mobile and/or stationary communication, control and/or computing devices such as a meter reader, teller machine, vehicle or goods tracker, theft alarm apparatus, radio, mobile phone, cellular phone, satellite phone, Smartphone, or a personal computer (PC) such as a desktop, notebook, tablet PC, personal digital assistant (PDA), game console, or peripherals such as a printer, camera, pointing device, or other apparatus, for example.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

For various reasons a number of wireless communication systems including GSM, UMTS and LTE are configured to restrict operative association of a wireless terminal to a portion of the wireless communication system at a time. This can help localize and reduce paging traffic, specifically during setup of a communication link when the wireless communication system needs to reach the wireless terminal, for example. It also, however, requires tracking the whereabouts of wireless terminals and the portion of the wireless communication system that may likely be successfully used to establish a communication link. For this purpose wireless communication systems and wireless terminals are configured to provide functions, for example via operation of data link layer protocols and databases, that facilitate associations and tracking of wireless terminals.

Figure 1:
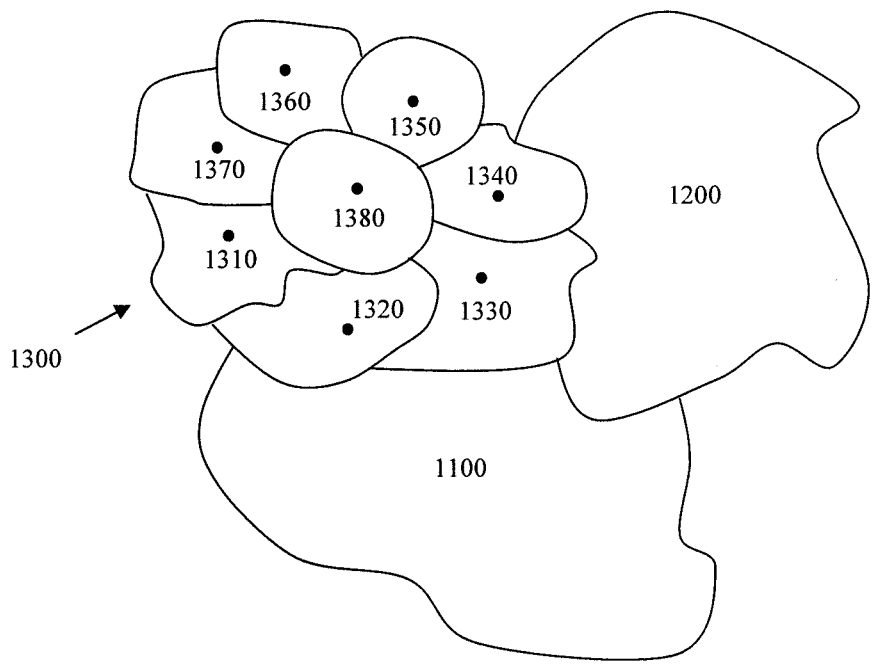
FIG. 1 illustrates a map of GSM/GPRS location and routing areas.
Figure 2:
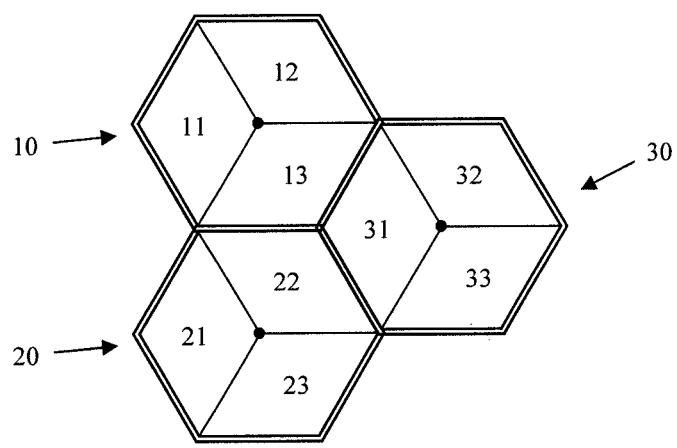
FIG. 2 illustrates a map of hexagonal cells of a wireless communication system.

UMTS and LTE, for example, divide the wireless communication system into different regions, for example, routing and location areas for UMTS, and tracking areas in LTE. FIG. 1 illustrates a schematic map of an example UMTS location area and its associated example routing areas. The map shows three routing areas 1100, 1200 and 1300. Also shown are eight cells 1310 to 1380 included in routing area 1300. Cell areas of the routing areas 1100 and 1200 are not shown. Each cell 1310 to 1380 includes a corresponding base station. FIG. 2 illustrates three adjacent example cells configured to cover approximately hexagonally shaped areas 10, 20, 30. A base station may be configured to serve each cell by dividing each cell into three sectors 11, 12, 13; 21, 22, 23; and 31, 32, 33, for example. Cell 10 may correspond with cell 1370, cell 20 with cell 1310 and cell 30 with cell 1380, for example.

Wireless terminals, such as UMTS and LTE wireless terminals, are configured to submit respective routing, location or tracking area update requests in accordance with respective procedures as is readily known in the art. An update request may be a position area update message, transmitted from the wireless terminal to one or more entities within the wireless communication system, such as service nodes, support nodes, databases, or the like, which are configured to track the wireless terminal's location or position within the network. The position area update message may be configured to request or instruct that the one or more entities update records of tracked location or position of the wireless terminal, in accordance with location or position information contained in the update message. Update requests or messages may be submitted in response to information encoded in different signals broadcast in different parts of the wireless communication system that are used to indicate the portion of the wireless communication system and the service provided by that portion covering a specific area and what wireless terminals in the specific area can be communicated with. For example, in UMTS the portion of the wireless communication system may be a routing area which is typically associated with packet switched data services or a location area which is typically associated with circuit switched voice services. A LTE system may be divided into tracking areas, for example. Both UMTS and LTE acknowledge successful area updates with corresponding acknowledgement messages. In UMTS and LTE, wireless terminals may also submit routing or location area updates and tracking area updates according to a predetermined schedule, for example at predetermined intervals.

The wireless communication system gathers and updates information about the position of each operatively associated wireless terminal and, for example, uses this information to determine in what portion of the wireless communication system to submit page request messages when trying to establish a link with the wireless terminal. This aspect of wireless communication systems has been used for voice services in human to human wireless terminals, for example. Other types of wireless terminals, however, may be used in different applications and may move or be accessed by the network with different probability and frequency. According to an embodiment of the present invention, different applications may require updating the position of the wireless terminal in response to different events with different frequency.

The need to track positions of wireless terminals and to perform position area updates in wireless communication systems depends on aspects of mobility of the applications of the wireless terminals. In some applications, for example in machine to machine wireless communication, wireless terminals may move less than when used in a mobile phone. In order to effectively operate a wireless communication system, updating the position of wireless terminals may therefore occur more often or upon different events on mobile phone applications than in meter reading wireless terminals, for example. With the increased use of wireless terminals for machine to machine communication, this has become an increasingly important aspect in network traffic management that, for example, UMTS and LTE do not address.

According to an aspect of the present invention there is provided a method for performing position area updates for a wireless terminal in a wireless communication system configured to broadcast a plurality of position area codes. The method may be used to reduce the number of position area updates sent by a wireless terminal. According to another aspect of the present invention there are provided methods for performing paging requests of wireless terminals in correspondence with the methods for performing position area updates. Embodiments of the present invention may be employed in wireless communication systems of various kinds, for example, in UMTS, LTE or other wireless communication systems.

According to another aspect of the present invention there is provided a method for collecting and analyzing data regarding predetermined communication characteristics of wireless terminals. The method for collecting and analyzing data may be used in combination with the methods for performing position area updates according to the present invention for determining activation of one of the methods for performing position area updates for use with corresponding wireless terminals in the wireless communication system and for determining corresponding intervals for scheduled periodic sending of position area updates.

The methods according to the present invention may be used in a number of applications of wireless terminals, for example, in machine-to-machine (M2M) applications for reducing position area update messages sent from M2M wireless data wireless terminals that receive little or no data from the network and/or which may be highly mobile, for example cellular asset tracking tags. The methods may be employed in one or more wireless terminals and/or one or more other parts of the wireless communication system.

Figure 3:
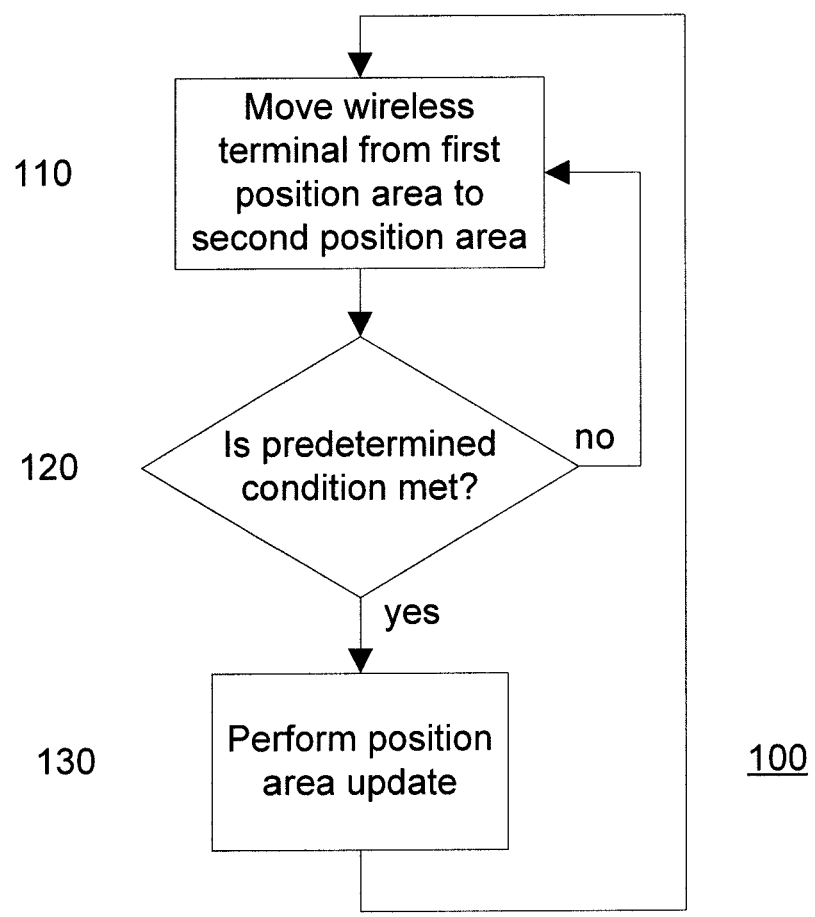
FIG. 3 illustrates a flow diagram of a method for performing a position area update according to an embodiment of the present invention.

FIG. 3 illustrates a flow diagram 100 of a method for performing a position area update according to an embodiment of the present invention. The method for performing a position area update generally comprises moving the wireless terminal from a first position area to a second position area 110; evaluating a predetermined condition 120; and performing the position area update when the predetermined condition is met 130. Each position area is associated with one of a plurality of position areas as indicated by a corresponding position area code broadcast by the wireless communication system in the corresponding position area.

According to embodiments of the present invention, moving the wireless terminal from a first position area to a second position area may involve occurrence of a predetermined event. The predetermined event may be, for example, receipt of a position area code different from a last received position area code, lapse of a predetermined time and determining that a current or last received position area code is different from a prior position area code, or lapse of a predetermined time and the wireless terminal querying the wireless communication system for a current position area code and determining that it is different from a prior position area code. As an example, a predetermined time may be determined according to a predetermined schedule and can be a fixed amount of time, a variable amount of time, a random amount of time or the like, for example.

Figure 4:
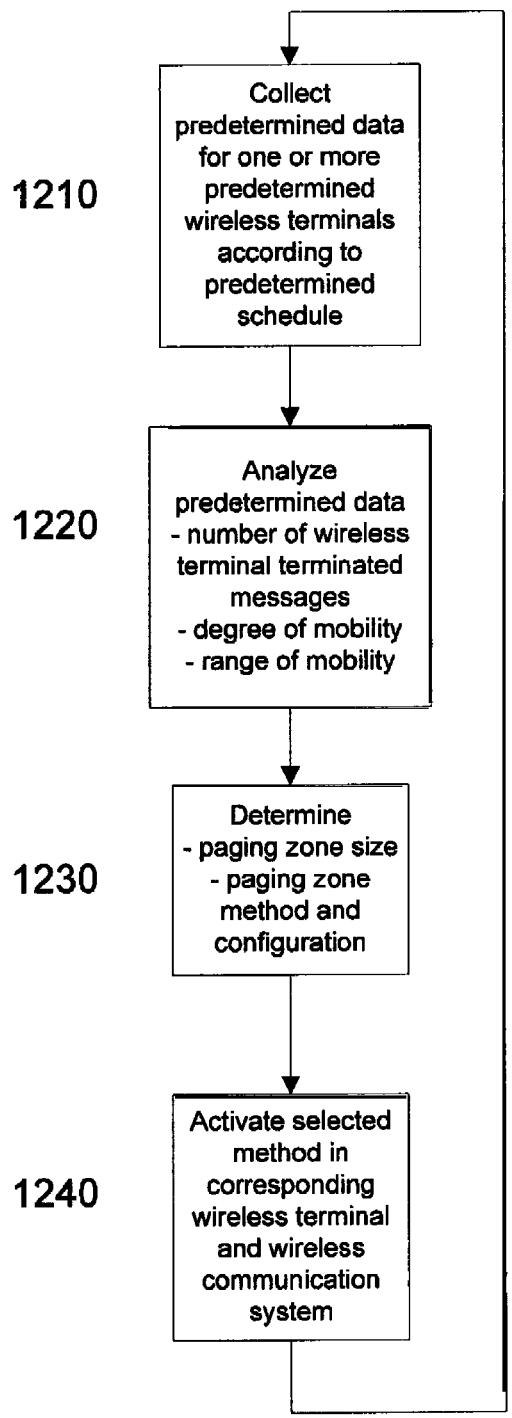
FIG. 4 illustrates a flow diagram of a method for evaluating mobility and paging aspects of a mobile wireless terminal and for selecting a position area update according to an embodiment of the present invention.

FIG. 4 illustrates a flow diagram of a method for evaluating mobility and paging aspects of a wireless terminal and for selecting a position area update according to an embodiment of the present invention. The method for evaluating mobility and paging aspects of a wireless terminal may be used to determine a method for performing position area updates selectively and/or independently for one or more predetermined wireless terminals and/or on a per wireless terminal basis. Determination of a method may comprise configuration of the method, and/or parameters thereof. The method may include determining a number of aspects including, for example, which position areas are to be combined into one or more paging zones, the size of combined paging zones, or in what sequence of position areas a wireless terminal will be paged in a corresponding paging zone.

The method illustrated in FIG. 4 includes collecting predetermined data for one or more predetermined wireless terminals according to a predetermined schedule during operation of the corresponding wireless terminal(s) in step 1210, analyzing the predetermined data in step 1220 and determining and activating which position area update method to use in the corresponding wireless terminal(s) in step 1230 and step 1240. For example, the method illustrated in FIG. 4 may be used to determine or adjust the predetermined condition 120 of FIG. 3. According to an embodiment of the present invention a method for selecting a position area update method may be performed in real time. A predetermined metric may be used to assess which one of one or more available position area update methods is to be selected.

In some embodiments, for the one or more wireless terminals, data regarding a predetermined number of aspects may be collected during an adequate monitoring period depending on the application of the wireless terminal. This period may be a random period or predetermined period, for example, a one day, one week or one month period. The data may include the number of wireless terminal terminated messages, the number of position area changes and, the total number of position areas over which the wireless terminal has roamed as indicated in step 1210, for example. Data may be collected and analyzed, for example statistically analyzed, for each wireless terminal separately, for a collection of wireless terminals, or a combination thereof.

One or more factors may be calculated from the collected data in step 1220 that may then be used to determine: which position areas are to be combined into one or more paging areas; and a position area update method appropriate for the particular wireless terminal. Subsequently the wireless terminal and the wireless communication system are correspondingly configured and the new methods are activated so data collection in step 1210 can be resumed.

It is noted that, in some embodiments, an increased paging area size may result in more paging messages being sent over a wider area when paging a wireless terminal, but fewer position area updates from the wireless terminal may occur. Configuration of a paging area size may be based at least in part on a trade-off between paging resource usage and position area update resource usage. Wireless terminals that may benefit from the disclosed methods may be used in applications when, for example, the number of wireless terminal terminated messages is expected to be small or even zero. In such cases large paging areas may be chosen so that position area update messages are rarely required. However, paging messages for wireless terminal terminated messages would potentially need to be transmitted over the same wide area. If a wireless terminal is used in an application that requires receiving messages, then the mobility of the wireless terminal becomes relevant in the selection and the number of movements and the area over which they are spread is relevant in the selection of the zone and the position area update method. If the wireless terminal receives more messages, increasing the paging zone area may be possible to select a specific set of areas over which position area updates, such as routing area updates, may not be necessary. One example would be a wireless terminal on a public transit bus that always moves in specific areas.

Figure 5:
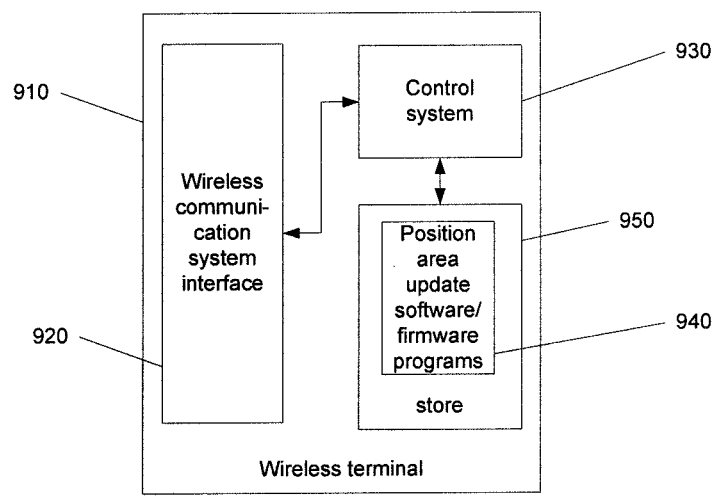
FIG. 5 illustrates a block diagram of a wireless terminal according to an embodiment of the present invention.

FIG. 5 illustrates a block diagram of a wireless terminal 910 according to an embodiment of the present invention. The wireless terminal 910 comprises a wireless communication system interface for communication with the wireless communication system, a control system 930 for controlling the operation of the wireless terminal and a store 950 for storing software and/or firmware for use in the control system 930. The store 950 may include one or more programs 940 for performing at least a part of the position area updates according to the embodiments of the present invention. The wireless communication system interface 920 is operatively connected to the control system 930. The control system 930 is operatively connected to the store 950. The store may comprise memory for storing information, data and/or program code in digital format. The control system 930 may comprise a microprocessor or a functional module of a microprocessor of the wireless terminal. The store 950 may be a non-volatile memory such as NVRAM or ROM memory. The store 950 may be an allocated portion of existing memory of the wireless terminal.

Figure 6:
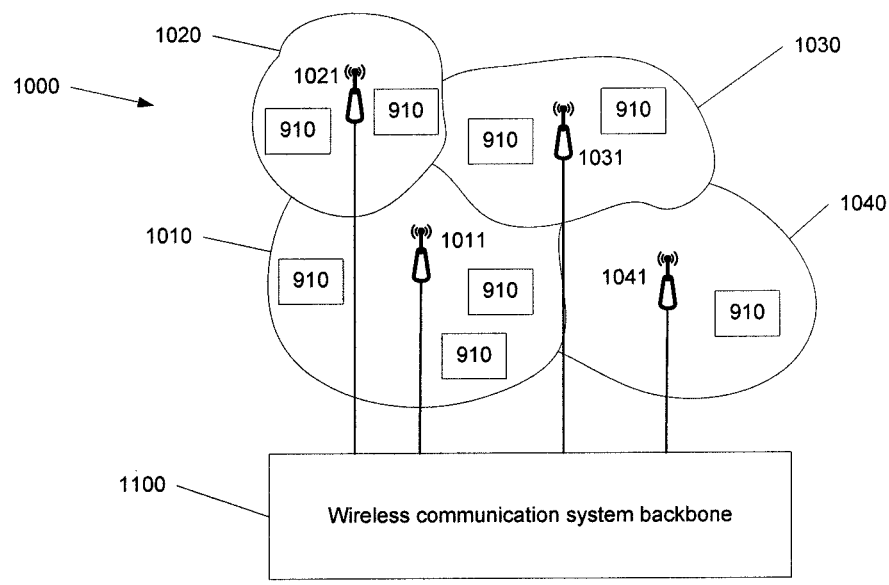
FIG. 6 illustrates a block diagram of an example wireless communication system according to an embodiment of the present invention.

FIG. 6 illustrates a block diagram of an example wireless communication system 1000 according to an embodiment of the present invention. The wireless communication system 1000 comprises position areas 1010, 1020, 1030 and 1040. Each position area includes one base station 1011, 1021, 1031 and 1041. It is noted that more than one base station may be included in each position area as is typically the case with GSM/GPRS and/or UMTS, for example. The wireless communication system 1000 includes a number of wireless terminals 910. Each base station 1011, 1021, 1031 and 1041 is operatively connected to a wireless communication system backbone 1100. The wireless communication system backbone 1100 provides wireless communication system wide services and operatively interconnects operatively associated infrastructure included in the position areas 1010, 1020, 1030 and 1040, for example, respective wireless terminals 910 and base stations 1011, 1021, 1031 and 1041, into an integral network. The wireless communication system backbone 1100 may be further interconnected with other wireless communication systems (not illustrated).

Figure 7:
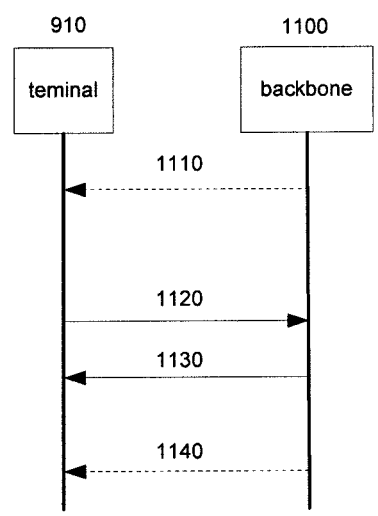
FIG. 7 illustrates a message flow diagram for communication between a wireless terminal and a wireless communication system backbone according to an embodiment of the present invention.

FIG. 7 illustrates a message flow diagram for communication between a wireless terminal 910 and a wireless communication system backbone 1100 according to an embodiment of the present invention. The wireless communication system backbone 1100 may be configured to broadcast signals including respective position area codes 1110 in respective position areas. In some embodiments, each base station may be configured to broadcast a position area code associated therewith. The wireless terminal 910 is configured to respond to receipt of position area codes, if so determined in accordance with methods according to embodiments of the present invention. For example, wireless terminal 910 may request and/or initiate a position area update by submitting a corresponding position area update message or request 1120. According to an embodiment of the present invention, the wireless communication system backbone 1100 is configured to acknowledge position area update messages or requests 1120 upon receipt and grant by responding to position area update messages 1120 with a position area update acknowledgement message 1130. According to an embodiment of the present invention, the wireless communication system backbone 1100 may further be configured to page the wireless terminal 910 as part of an attempt to contact the wireless terminal 910, for example. For example, when a call to the wireless terminal needs to be established.

According to an embodiment of the present invention, a method for performing a position area update comprises the wireless terminal submitting to the wireless communication system a position area update message indicating a current position area with which the wireless terminal is to be associated. Upon receipt of the message, which in some embodiments may be viewed as a request, the wireless communication system evaluates the request and if granted retains the current position area for the corresponding wireless terminal. According to another embodiment of the present invention, the wireless communication system generates a position area update acknowledgement message and submits the position area update acknowledgement message to the wireless terminal.

A wireless communication system according to an aspect of the present invention is configured to account for possible dislocations of wireless terminals from a position area corresponding with the last position area update. For example, when paging a wireless terminal, the wireless communication system may be configured to page in position areas in stages or in all position areas at once. For example, the wireless communication system may page in the position area of the last position area update for the desired wireless terminal before it pages in other position areas that the wireless terminal may possibly be residing. These other position areas may be determined based on the nature of one or a combination of two or more predetermined conditions employed by methods for position area updates according to embodiments of the present invention.

Predetermined Condition

According to an aspect of the present invention moving a wireless terminal from one position area to another position area triggers the evaluation of a predetermined condition by the wireless terminal. The result of the evaluation determines whether an update of the position area is to be attempted by the wireless terminal. Performing a position area update may include granting a position area update request by the wireless communication system. According to an aspect of the present invention, a wireless communication system and/or wireless terminal may be configured to employ one or a combination of two or more predetermined conditions to decide if a position area update is to be performed.

According to an aspect of the present invention, the wireless communication system may be configured to determine the position areas within which it needs to submit page requests in order to reach a respective wireless terminal. The wireless communication system may be configured to track and process the predetermined conditions in use with respect to a wireless terminal in order to determine the one or more position areas within which it needs to submit page requests for that wireless terminal.

Methods according to some embodiments of the present invention may be applied in UMTS, LTE or other wireless communication systems. For example, in UMTS, the position areas may correspond with routing areas or location areas or other optional new areas. In LTE, the position areas may correspond with tracking areas or in other optional new areas, for example. In a wireless communication system, for example, a network node and a wireless terminal may be configured to retain information and perform actions corresponding to the predetermined conditions described herein.

Predetermined conditions for use in methods according to some embodiments of the present invention include a predetermined condition based at least in part on a UMTS location area, distance a wireless terminal has travelled, proximity coded position area codes, grouping of position areas, group position codes, and mobile network and country codes. Two or more predetermined conditions may be used in combination in order to determine if a position area update may be required.

Predetermined Condition Based on UMTS Location Area

According to an embodiment of the present invention, a wireless terminal may be configured to transmit a position area update message in a UMTS service upon a change of received UMTS location area codes. According to this embodiment, the position area update corresponds to a routing area update performed when the location area changes. According to the embodiment, paging for UMTS services is performed based on location areas rather than routing areas. In UMTS systems location areas are typically larger than routing areas and given the same roaming path, wireless terminals cross fewer location areas or boundaries thereof than routing areas or boundaries thereof. As both location area codes and routing area codes are broadcast by a UMTS system, a wireless terminal configured with a corresponding method may use changes in received routing area codes as a trigger to subsequently evaluate if the location area code has changed as well. Alternatively, the wireless terminal may monitor for changes of the received location area codes to determine if a position or routing area update message is to be submitted.

Predetermined Condition Based on Distance Travelled

According to another embodiment of the present invention, a wireless terminal may be configured to evaluate, upon moving the wireless terminal from a first position area to a second position area, if the wireless terminal has moved a predetermined number of position areas away from the position area defined in the last position area update. Accordingly, the wireless terminal can be configured to transmit a position area update message once it has travelled the predetermined number of position areas away from the last position area update.

According to an embodiment, when the wireless terminal is configured to transmit a position area update message once it has travelled the predetermined number of position areas away from the last position area update, the wireless communication system may be configured to page for the wireless terminal by paging within the last reported position area as well as within surrounding position areas into which the wireless terminal could potentially have travelled without triggering a position area update. In some embodiments, paging in plural position areas may be performed substantially concurrently. In some embodiments, paging in plural position areas may be performed substantially sequentially, for example by first paging in the last reported position area, then paging outward in nearby position areas.

Figure 8:
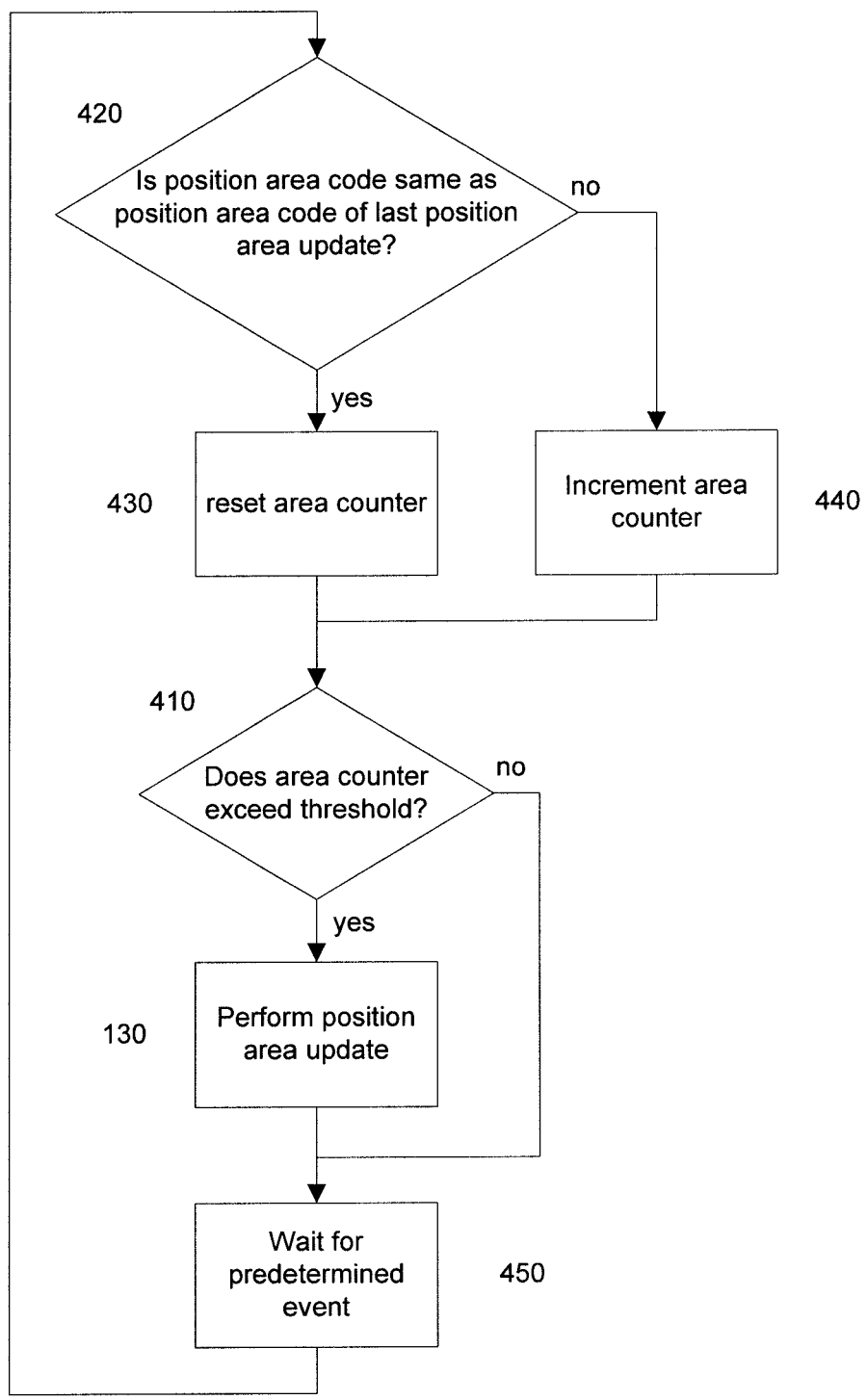
FIG. 8 illustrates a flow diagram of a method employing a predetermined condition based on distance travelled according to an embodiment of the present invention.

FIG. 8 illustrates a flow diagram of a method employing a predetermined condition based on distance travelled according to an embodiment of the present invention. The predetermined condition evaluates if the current position area code equals the position area code of the last position area update in step 420. If this is the case, an area counter is reset in step 430; otherwise the area counter is incremented in step 440. The predetermined condition further evaluates if the area counter exceeds a predetermined threshold in step 410. If this is the case, the predetermined condition is met and the method proceeds to perform a position area update as indicated by step 130 as described above. Otherwise, the method waits for a predetermined event in step 450, for example, receipt of a position area code different from a last received position area code; lapse of a predetermined time and determining that a current or last received position area code is different from a prior position area code, or lapse of a predetermined time and the wireless terminal querying the wireless communication system for a current position area code and subsequently determining that it is different from a prior position area code. According to embodiments, a predetermined time can be a fixed amount of time, a variable amount of time, a random amount of time or the like, for example.

In some embodiments, the wireless terminal may be configured to log in a record at least what changes of position area codes have occurred and optionally when changes of position area codes have occurred or the residence or dwell times of the wireless terminal in one or more of these position areas, or other corresponding information, for example. The wireless terminal may be configured to log and/or evaluate a predetermined number of records of traversed position areas. The storage area or store allocated in the wireless terminal for this purpose may be configured to be able to hold at least an amount of data required to log a predetermined number of records between position area updates. In some embodiments, records may subsequently be used for analysis of wireless terminal movement and/or for evaluation of the predetermined condition associated with performing position area updates.

A wireless terminal according to an embodiment of the present invention may be optionally configured to consider dwell times in position areas during a predetermined period or amount of time, for example a predetermined time of each day, a predetermined weekday, week, day or week of a month, month and so forth depending on the application of the wireless terminal. The predetermined amount of time may be a period including the latest ten seconds or minutes, for example.

According to an embodiment of the present invention, the wireless terminal may be configured to transmit a position area update message when the average dwell time per predetermined period or amount of time exceeds a predetermined threshold. For example, if the wireless terminal dwells beyond the predetermined number of position areas only for 10% of the time since the last position area update, the wireless terminal may be configured to inhibit a scheduled or pending position area update. A wireless terminal according to some embodiments of the present invention may employ one or more of a number of statistical analyses in order to determine if a position area update is to be performed.

In some embodiments, when the wireless terminal is configured to transmit a position area update message when the average dwell time per predetermined period or amount of time exceeds a predetermined threshold, the wireless communication system may be configured to page for the wireless terminal by paging in one or more position areas in which the wireless terminal has previously initiated position area updates. If the wireless terminal does not respond to the page, the wireless communication system may be configured to page in other position areas, and/or it may be configured to wait until the wireless terminal performs a new position area update before paging again. By using a combination of predetermined conditions, an area within which the wireless terminal can be determined to presently reside for paging purposes may be established.

Predetermined Condition Based on Proximity Coded Position Area Codes

According to an embodiment of the present invention, a wireless communication system may be configured so that position area codes are assigned to position areas in such a way that proximity between position areas is expressed in the difference between the corresponding position area codes. According to this embodiment, a wireless terminal and wireless communication system may be configured to evaluate the difference between position area codes received as a result of a move of the wireless terminal. For example, a difference may be evaluated if one or more predetermined bits of a position area code received before the wireless terminal was moved differ from the new position area code received as a result of the move. The wireless communication system may be configured so that the information encoded in the difference, for example a bit-by-bit difference, indicates proximity between position areas.

Figure 9:
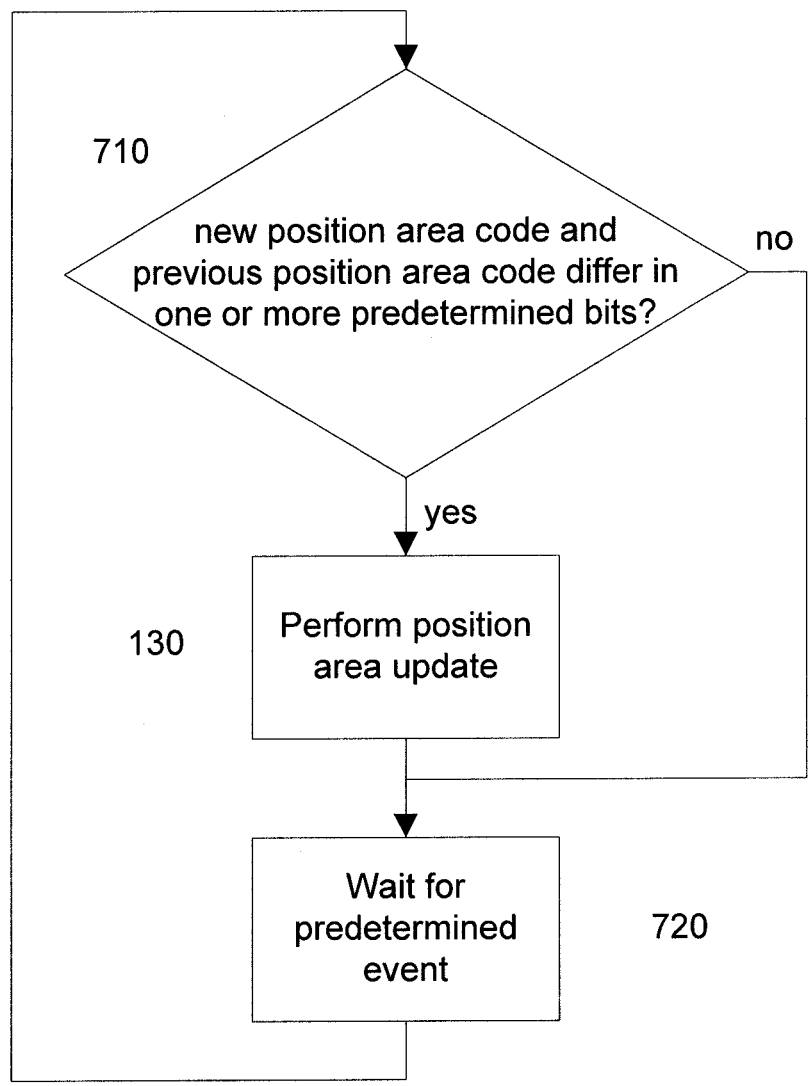
FIG. 9 illustrates a flow diagram of a method employing a predetermined condition based on proximity coded position area codes according to an embodiment of the present invention.

FIG. 9 illustrates a flow diagram of a method employing a predetermined condition based on proximity coded position area codes according to an embodiment of the present invention. The predetermined condition evaluates if the current position area code and the previous position area code differ in one or more predetermined bits in step 710, for example in a predetermined number of bits in a set of predetermined positions. In some embodiments, a bit mask, binary mapping and/or logic operation may be employed at the wireless terminal to facilitate evaluation of the predetermined condition. If this is the case, the predetermined condition is met and the method proceeds to perform a position area update as indicated by step 130 as described above. Otherwise, the method waits for a predetermined event in step 720, for example, receipt of a position area code different from a last received position area code, lapse of a predetermined time and determining that a current or last received position area code is different from a prior position area code, or lapse of a predetermined time and the wireless terminal querying the wireless communication system for a current a position area code and determining that it is different from a prior position area code. As an example, a predetermined time can be a fixed amount of time, a variable amount of time, a random amount of time or the like.

According to embodiments, proximity between position area may be defined in terms of neighbours, for example, nearest neighbours, next nearest neighbours and so forth. This method may be used to define paging areas that include more than one position area. According to this embodiment, position area updates may need to be performed less often only if one or more predetermined bits in the respective position area codes have changed.

Figure 10:
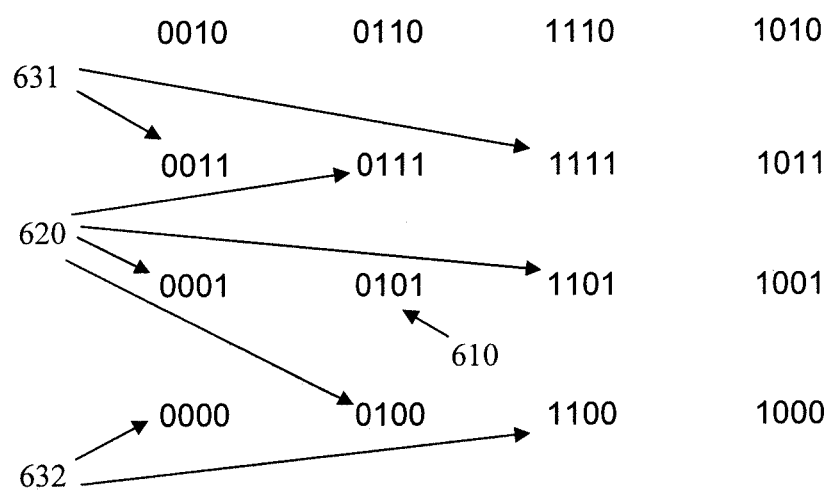
FIG. 10 illustrates elements of a two-dimensional rectangular Gray code for use in some embodiments of the present invention.

According to an embodiment of the present invention, proximity coding of position areas may employ two-dimensional Gray coding, for example. FIG. 10 illustrates an example of a two-dimensional rectangular Gray code for use in some embodiments of the present invention. As illustrated horizontally and vertically adjacent codes differ by one bit, diagonally adjacent codes differ by two bits. Other non-rectangular coding systems may be used for other position area grids.

In some embodiments, the wireless communication system may be configured to page for the wireless terminal by paging in one or more position areas commensurate with the last reported position and the predetermined condition associated with the wireless terminal, such that paging is restricted to areas wherein the wireless terminal is known or likely to possibly reside.

Predetermined Condition Based on Grouping of Position Areas

According to an aspect of the present invention, a wireless communication system and wireless terminal may be configured to perform position area updates only when a boundary of a group of position areas is crossed. According to an embodiment of the present invention the wireless communication system and the wireless terminal may be configured to include information about which position areas are associated with which group of position areas. The information is stored in corresponding stores in the wireless terminal and the wireless communication system. According to an embodiment of the present invention, information about groups of position areas may be broadcast by the wireless communication system for receipt by the wireless terminals. This information may be temporarily stored or permanently retained by suitably configured wireless terminals.

In some embodiments, when a wireless terminal receives a position area code, it evaluates if the new position area code is included in the same group as the previously received position area code by referencing the information stored in the corresponding store. The wireless terminal is configured to submit a position area update message when the new position area code is included in a different group of position areas.

Figure 11:
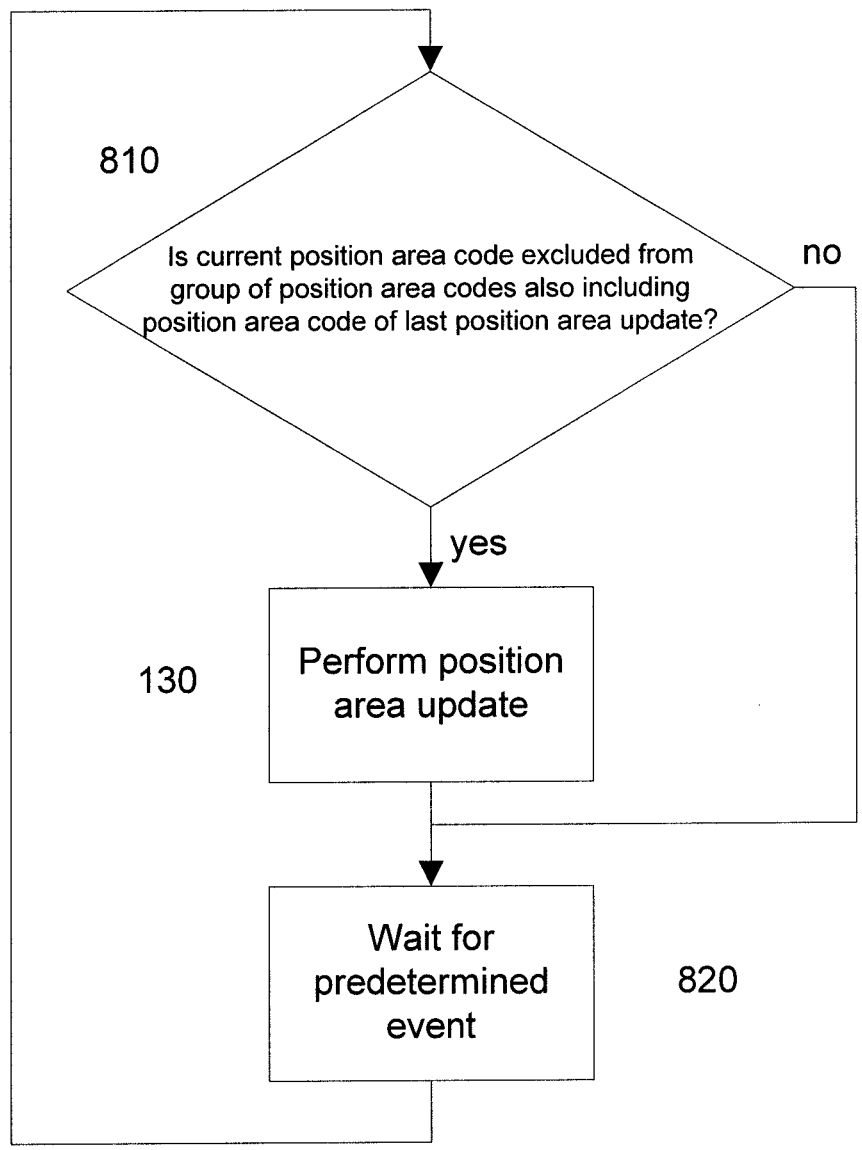
FIG. 11 illustrates a flow diagram of a method employing a predetermined condition based on grouping of position areas according to an embodiment of the present invention.

FIG. 11 illustrates a flow diagram of a method employing a predetermined condition based on grouping of position areas according to an embodiment of the present invention. The predetermined condition evaluates if the current position area code is excluded from the same group of position area codes that also includes the position area code of the last position area update in step 810. If this is the case, the predetermined condition is met and the method proceeds to perform a position area update as indicated by step 130 as described above. Otherwise, the method waits for a predetermined event in step 820, for example, receipt of a position area code different from a last received position area code, lapse of a predetermined time and determining that a current or last received position area code is different from a prior position area code, or lapse of a predetermined time and the wireless terminal querying the wireless communication system for a current position area code and determining that it is different from a prior position area code. As an example, a predetermined time can be a fixed amount of time, a variable amount of time, a random amount of time or the like.

According to this embodiment, the wireless communication system is correspondingly configured to update a position area associated with a wireless terminal in response to a position area update message or request. For example, the wireless communication system may be configured to log the group of position areas for each operatively associated wireless terminal. According to this embodiment, the wireless communication system may be configured to page for wireless terminals in all position areas included in the group of position areas associated with the wireless terminal.

Predetermined Condition Based on Group Position Area Codes

According to an aspect of the present invention, a wireless communication system and wireless terminal may be configured to perform position area updates only when a boundary of a group of position areas is crossed. According to an embodiment of the present invention, the wireless communication system and the wireless terminal are configured respectively to broadcast and receive group position area codes. According to this embodiment, group position area codes indicate a group of position areas. When the wireless terminal receives a position area code, it evaluates if the group position area code is different from the previously received code. According to this embodiment, the wireless terminal is configured to submit a position area update message when a new group position area code is received.

Predetermined Condition Based on Mobile Network and Country Codes

According to an aspect of the present invention, a wireless communication system and wireless terminal may be configured to perform position area updates only when a boundary of a mobile network area or mobile country area is crossed. According to an embodiment of the present invention the wireless communication system and the wireless terminal are configured respectively to broadcast and receive a mobile network area code and/or mobile country area code. According to this embodiment, a mobile network area code or mobile country area code indicates a boundary of a wireless communication system by country or network operator, for example. When the wireless terminal receives a mobile network area code or mobile country area code, it evaluates if the mobile network area code or mobile country area code is different from a previously received corresponding code. According to this embodiment, the wireless terminal is configured to submit a position area update message when a new mobile network area code and/or mobile country area code is received.

In some embodiments, the predetermined condition may vary in time, for example in accordance with a schedule known to the wireless terminal and the wireless communication system. For example, the predetermined condition may be configured to result in a low number of expected position area updates during a first time interval, but it may be configured to change during a second, shorter time interval, such that expected position area updates are more frequent. Alternatively, the predetermined condition may comprise the condition that a predetermined time has elapsed, thereby triggering a position area update at least periodically. The wireless communication system may be configured to predict the next position area update or period of frequent position area updates. This may facilitate establishing periods of time where it is easier to page the wireless terminal, for example in order to apply software updates, or the like.

The invention will now be described with reference to specific examples. It will be understood that the following examples are intended to describe embodiments of the invention and are not intended to limit the invention in any way.

EXAMPLES

Example 1

Figure 12:
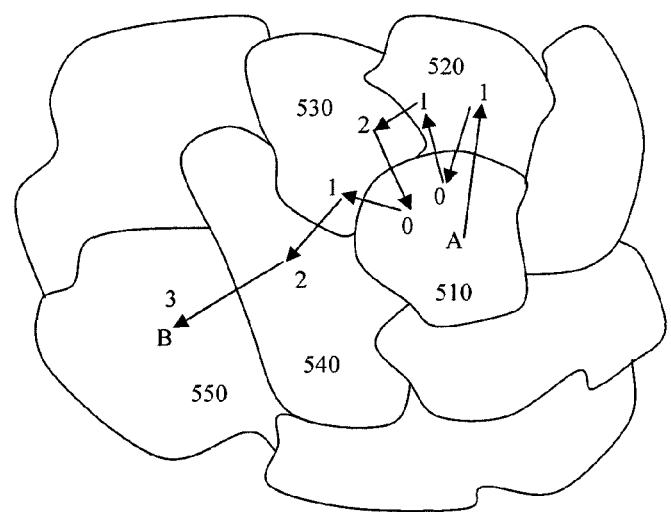
FIG. 12 illustrates a map of position areas and an example path and events for a method according to an embodiment of the present invention.

FIG. 12 illustrates an example method according to an embodiment of the present invention that is based on a predetermined condition using distance travelled by a wireless terminal since the last position area update. The example method may be employed in a UMTS, LTE or other wireless communication systems, for example. The position areas illustrated in FIG. 12 may correspond with location or routing areas of a UMTS system or tracking areas of the LTE wireless communication system or other areas, for example. The most recent position area update is performed for the initial position area 510 as indicated by A in position area 510. The wireless terminal has traversed position areas 510 to 550 along the path indicated by the arrows. The number of different position areas the wireless terminal has traversed is being tracked in a counter and is indicated by numbers 0, 1, 2, 3 in position areas 510 to 550. A revisit of the initial position area 510, for example from position area 530 as illustrated, resets a counter for counting the number of traversed different position areas. The threshold for the number of traversed position areas is predetermined and is set to be three in this example. Therefore a position area update is to be performed after the wireless terminal enters position area 550 as indicated by B. After the position area update for position area 550 has been performed, the wireless terminal resets the counter.

The corresponding example wireless communication system is configured to account for the possible dislocation of wireless terminals from a position area of the last position area update. When paging a wireless terminal, the wireless communication system may be configured to page in position areas in stages or all at once. For example, the wireless communication system may perform a first page in the position area of the last position area update before it pages in other adjacent position areas in which the wireless terminal may reside due to the nature of the position area update method of this embodiment. The wireless communication system may be configured to perform a second page in all such other position areas at once if a response to the first page is not received within a predetermined time. In this example, paging may be performed in all position areas accessible from the last reported position area by crossing three or fewer boundaries.

Example 2

An example method according to another embodiment of the present invention employs proximity coded position areas. The example method may be employed in adequately configured UMTS, LTE or other wireless communication systems with rectangularly, triangularly, hexagonally or otherwise arranged and/or configured position areas, for example. The proximity coding of position areas, for example rectangularly arranged areas, of the example method may employ a two-dimensional orthogonal Gray code as illustrated in FIG. 10. As illustrated for example, horizontally and vertically adjacent codes differ by one bit, diagonally adjacent codes differ by two bits. For example binary code 610 differs from any one of binary codes 620 in one bit and by diagonally adjacent binary codes 631 and 632 in two bits. Similar or other coding schemes may be used in triangularly, hexagonally or otherwise arranged position areas, and may be characterized by providing correlations between bit difference and proximity that are different from the example illustrated in FIG. 10.

The example method is configured to perform a position area update if the new position area code received as a result of moving a wireless terminal differs from the previous one by two or more bits. A wireless terminal configured in accordance with the example method does not transmit a position area update message when moving to a vertically or horizontally adjacent position area. In this example, when paging, the wireless communication system is configured to account for possible vertical and horizontal movement of wireless terminals due to the delayed position area update. The wireless communication system may page in the last reported position area as well as areas accessible by crossing a boundary edge of the last reported position area. Paging may be performed in plural position areas substantially concurrently, substantially sequentially, or a combination thereof.

Example 3

Figure 13:
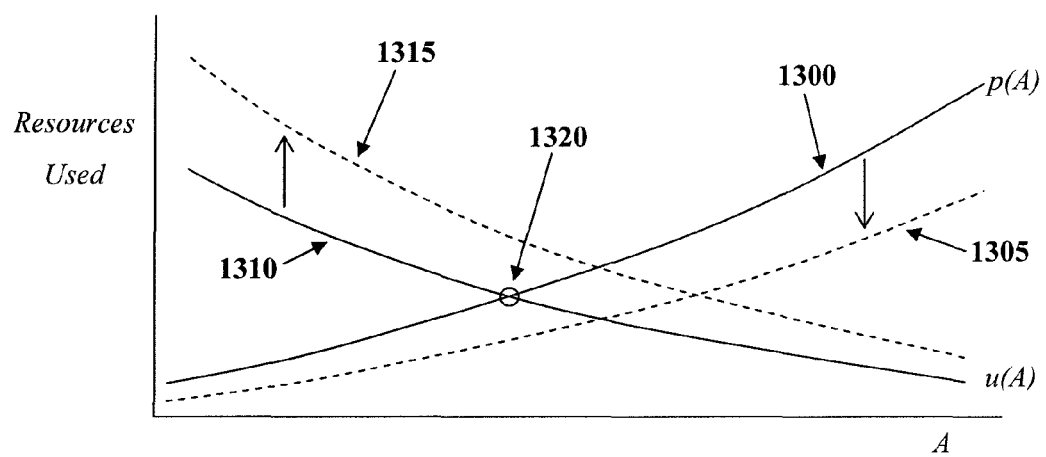
FIG. 13 illustrates a graph of wireless communication system resource usages according to an embodiment of the present invention.

FIG. 13 illustrates a graph of wireless communication system resource usage p(A) 1300 associated with paging a wireless terminal, and resource usage u(A) 1310 associated with performing routing area updates due to movement of the wireless terminal, each as a function of an area size A, denoting the size of one or more areas in which the wireless terminal is permitted to move without performing a position area update, in accordance with an embodiment of the invention. As area size A increases, p(A) may increase since paging the wireless terminal may require transmitting paging messages over a wider region, from more base stations, or the like. As area size A increases, u(A) may decrease since the wireless terminal may cross fewer boundaries corresponding to triggering of position area updates by the wireless terminal. Additionally, p(A) may be an increasing function of an average rate $\lambda$ at which paging requests are generated, and u(A) may be an increasing function of an average rate $\mu$ at which boundaries between regions of size A are crossed. For example, a decrease in $\lambda$ would correspond to a downward shift of p(A) from curve 1300 to curve 1305. An increase in $\mu$ would correspond to an upward shift of u(A) from curve 1310 to curve 1315. Rates $\lambda$ and $\mu$ may be measured parameters due to actual history of events associated with the wireless terminal, modeled parameters, nominal parameters, or the like, or a combination thereof. In one embodiment, area size A may be configured, via configuration of the predetermined conditions associated with the wireless terminal, to at least approximately minimize the sum p(A)+u(A). In some embodiments, a weighted sum may be minimized. The solution to this minimization is represented as the value of A corresponding to the intersection of curves p(A) and u(A), using appropriate values of $\lambda$ and $\mu$. One such intersection is illustrated as point 1320. Such an area size A represents a trade-off between use of resources for paging and use of resources for performing position area updates, in an embodiment of the invention.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for performing a position area update for a wireless terminal in a wireless communication system configured to broadcast a plurality of position area codes, each position area code associated with one of a plurality of position areas, the method comprising:
   a. selecting a predetermined condition from a plurality of predetermined conditions, wherein the selecting is based at least in part on records of movement of the wireless terminal;
   b. evaluating the predetermined condition upon movement of the wireless terminal from a first position area to a second position area; and
   c. performing the position area update when the predetermined condition is met;
   wherein each position area is defined as a portion of the wireless communication system that is used to service a corresponding geographical region, wherein movement from the first position area to the second position area triggers generation of a position area update request by the wireless communication system, and wherein performing the position area update comprises granting the position area update request by the wireless communication system.

2. The method according to claim 1, wherein the selecting is performed in real time.

3. The method according to claim 1, further comprising recording times regarding movement from the first position area to the second position area in the records of movement.

4. The method according to claim 1, further comprising recording in the records of movement a first position area code associated with the first position area when moving from the first position area to the second position area.

5. The method according to claim 1, further comprising recording in the records of movement a second position area code associated with the second position area when moving from the first position area to the second position area.

6. The method according to claim 1 wherein the selecting is based at least in part on a predetermined statistical evaluation of the records of movement.

7. The method according to claim 1, wherein the selecting is performed by the wireless terminal.

8. The method according to claim 1, wherein the wireless communication system is further configured to broadcast a plurality of UMTS location area codes and the predetermined condition comprises evaluating if a first location area code received by the wireless terminal in the first position area differs from a second location area code received by the wireless terminal in the second position area.

9. The method according to claim 1, wherein the predetermined condition comprises evaluating if the wireless terminal has moved a predetermined number of position areas away from a position area defined during a last position area update.

10. The method according to claim 1, wherein the predetermined condition comprises evaluating if a first position area code received by the wireless terminal in the first position area and a second position area code received by the wireless terminal in the second position area differ in one or more predetermined bits.

11. The method according to claim 1, wherein the predetermined condition comprises evaluating if the first position area is included in a predetermined group of one or more first position areas and the second position area is included in a predetermined group of one or more second position areas.

12. The method according to claim 1, wherein the wireless communication system is further configured to broadcast a plurality of group position area codes and the predetermined condition comprises evaluating if a first group position area code received by the wireless terminal in the first position area differs from a second group position area code received by the wireless terminal in the second position area.

13. The method according to claim 1, wherein the wireless terminal is configured to receive mobile country codes and the predetermined condition comprises evaluating if a first mobile country code received by the wireless terminal in the first position area differs from a second mobile country code received by the wireless terminal in the second position area.

14. The method according to claim 1, wherein the wireless terminal is configured to receive mobile network codes and the predetermined condition comprises evaluating if a first mobile network code received by the wireless terminal in the first position area differs from a second mobile network code received by the wireless terminal in the second position area.

15. The method according to claim 1, wherein the predetermined condition is evaluated by the wireless terminal.

16. The method according to claim 1, wherein performing the position area update comprises transmitting to the wireless communication system a position area update message indicating a current position area corresponding to the second position area for association with the wireless terminal.

17. The method according to claim 16, wherein performing the position area update further comprises the wireless communication system retaining information about the current position area of the wireless terminal.

18. The method according to claim 17, wherein performing the position area update further comprises the wireless communication system generating and transmitting a position area update acknowledgement message.

19. A wireless communication system configured to broadcast a plurality of position area codes, each position area code associated with one of a plurality of position areas;
the wireless communication system including one or more wireless terminals and a wireless communication system backbone operatively coupled to the one or more wireless terminals;
the one or more wireless terminals and the wireless communication system backbone configured to select a predetermined condition from a plurality of predetermined conditions, the predetermined condition related to one of the one or more wireless terminals, wherein the selecting is based at least in part on records of movement of said one of the one or more wireless terminals, the one or more wireless terminals and the wireless communication system backbone further configured to perform a position area update when said one of the one or more of the wireless terminals move from a first position area to a second position area and the predetermined condition is met;
wherein each position area is defined as a portion of the wireless communication system that is used to service a corresponding geographical region, wherein movement from the first position area to the second position area triggers generation of a position area update request by the wireless communication system, and wherein performing the position area update comprises granting the position area update request by the wireless communication system.

20. The wireless communication system according to claim 19 further configured to broadcast a plurality of UMTS location area codes and the predetermined condition comprises evaluating if a first location area code received by the wireless terminal in the first position area differs from a second location area code received by the wireless terminal in the second position area.

21. The wireless communication system according to claim 19, wherein the predetermined condition comprises evaluating if the wireless terminal has moved a predetermined number of position areas away from a position area defined during a last position area update.

22. The wireless communication system according to claim 19, wherein the predetermined condition comprises evaluating if a first position area code received by the wireless terminal in the first position area and a second position area code received by the wireless terminal in the second position area differ in one or more predetermined bits.

23. The wireless communication system according to claim 19, wherein the predetermined condition comprises evaluating if the first position area is included in a predetermined group of one or more first position areas and the second position area is included in a predetermined group of one or more second position areas.

24. The wireless communication system according to claim 19 further configured to broadcast a plurality of group position area codes and the predetermined condition comprises evaluating if a first group position area code received by the wireless terminal in the first position area differs from a second group position area code received by the wireless terminal in the second position area.

25. The wireless communication system according to claim 19, wherein each wireless terminal is configured to receive mobile country codes and the predetermined condition comprises evaluating if a first mobile country code received by the wireless terminal in the first position area differs from a second mobile country code received by the wireless terminal in the second position area.

26. The wireless communication system according to claim 19, wherein each wireless terminal is configured to receive mobile network codes and the predetermined condition comprises evaluating if a first mobile network code received by the wireless terminal in the first position area differs from a second mobile network code received by the wireless terminal in the second position area.

27. The wireless communication system according to claim 19, wherein the wireless communication system is configured as a universal mobile telephone system (UMTS).

28. The wireless communication system according to claim 27, wherein the position areas are routing areas.

29. The wireless communication system according to claim 19, wherein the wireless communication system is configured as a long term evolution (LTE) system.

30. The wireless communication system according to claim 29, wherein the position areas are tracking areas.

31. The wireless communication system according to claim 19, wherein paging of a wireless terminal comprises:
   a. determining a last reported position area associated with a most recent position area update of the wireless terminal;
   b. determining the predetermined condition associated with the wireless terminal;
   c. determining, based at least in part on the last reported position area and the predetermined condition associated with the wireless terminal, one or more potential position areas in which the wireless terminal may reside; and
   d. paging the wireless terminal within one or more of the potential position areas.

32. A wireless terminal for performing a position area update in a wireless communication system configured to broadcast a plurality of position area codes, each position area code associated with one of a plurality of position areas, the wireless terminal comprising:
   a. a wireless communication system interface configured to communicate with the wireless communication system and to receive the position area codes; and
   b. a control system operatively coupled to the wireless communication system interface and configured to select a predetermined condition from a plurality of predetermined conditions, wherein the selecting is based at least in part on records of movement of the wireless terminal, evaluate a predetermined condition and to perform the position area update when the predetermined condition is met;
   wherein each position area is defined as a portion of the wireless communication system that is used to service a corresponding geographical region, wherein movement from a first position area to a second position area triggers generation of a position area update request by the wireless communication system, and wherein performing the position area update comprises granting the position area update request by the wireless communication system.

* * * * *